United States Patent
Lee et al.

(10) Patent No.: US 8,031,320 B2
(45) Date of Patent: Oct. 4, 2011

(54) LCD PANEL AND ARRAY SUBSTRATE THEREOF

(75) Inventors: Chung Ta Lee, Hsin-Chu (TW); Yu Tung Wu, Hsin-Chu (TW)

(73) Assignee: AU Optronics Corporation, Hsin-chu (TW)

( * ) Notice: Subject to any disclaimer, the term of this patent is extended or adjusted under 35 U.S.C. 154(b) by 215 days.

(21) Appl. No.: 12/346,077

(22) Filed: Dec. 30, 2008

(65) Prior Publication Data

US 2010/0002182 A1 Jan. 7, 2010

(30) Foreign Application Priority Data

Jul. 1, 2008 (TW) ................................ 97124673 A

(51) Int. Cl.
*G02F 1/1339* (2006.01)
(52) U.S. Cl. ......... 349/154; 349/153; 349/190; 349/138
(58) Field of Classification Search .................... 349/154
See application file for complete search history.

(56) References Cited

U.S. PATENT DOCUMENTS

| | | | |
|---|---|---|---|
| 5,335,103 A | 8/1994 | Kim | |
| 5,893,625 A * | 4/1999 | Tamatani et al. ............. | 349/189 |
| 6,982,777 B2 * | 1/2006 | Lai et al. ........................ | 349/153 |
| 2004/0257501 A1 * | 12/2004 | Kim et al. ...................... | 349/110 |
| 2005/0094088 A1 * | 5/2005 | Kao et al. ...................... | 349/190 |
| 2005/0099580 A1 * | 5/2005 | Lee et al. ....................... | 349/156 |
| 2007/0132934 A1 * | 6/2007 | Amano ........................... | 349/153 |
| 2008/0137024 A1 * | 6/2008 | Nagami et al. ................. | 349/154 |

FOREIGN PATENT DOCUMENTS

| | | |
|---|---|---|
| JP | 57130013 | 8/1982 |
| JP | 11133406 | 5/1999 |
| JP | 2006-98609 | 4/2006 |

OTHER PUBLICATIONS

China Office Action dated May 8, 2009 for corresponding application 2008101280023 which cites JP2006-98609.

* cited by examiner

*Primary Examiner* — Thanh-Nhan Nguyen
(74) *Attorney, Agent, or Firm* — WPAT, P.C.; Anthony King

(57) ABSTRACT

An LCD panel includes an array substrate, an opposite substrate and a liquid crystal layer. The opposite substrate is opposite to the array substrate, and the liquid crystal layer is disposed between the array substrate and the opposite substrate. The array substrate includes a substrate, an array, a sealant and a stop structure. The array disposed on the substrate is a thin-film transistor array or a color filter array. The sealant has a first end and a second end, and the first and second ends form an inlet. The stop structure is placed at least between the first end of the sealant frame and a side of the substrate.

7 Claims, 9 Drawing Sheets

LCD PANEL AND ARRAY SUBSTRATE THEREOF

BACKGROUND OF THE INVENTION (A) Field of the Invention

The present invention relates to a liquid crystal display (LCD) panel and the array substrate thereof, and more specifically, to an LCD panel and the array substrate with a sealant-stop structure of a liquid crystal inlet.

(B) Description of Related Art

LCDs have many advantages such as thin panel, light weight, low power consumption and low radiation, and therefore are widely used in current display applications. An LCD display mainly includes an LCD panel and a backlight unit. The backlight unit serves as illumination source to the LCD panel, and the rotations of the liquid crystals are controlled by electrical signals so as to display images.

FIG. 1 shows the top perspective view of an LCD panel 100, wherein the color filter (CF) array substrate 104 is placed above the thin-film transistor (TFT) array substrate 102. For the LCD cell manufacturing, a sealant frame 108 is formed around the perimeter of the CF array substrate 104 or the TFT array substrate 102 to be a boundary after the CF array substrate 104 and the TFT array substrate 102 are assembled. A liquid crystal inlet 110 is formed between the two ends of the sealant frame 108, and liquid crystal 106 is injected into the space confined by the sealant frame 108, the TFT array substrate 102 and the CF array substrate 104.

SUMMARY OF THE INVENTION

The present invention provides an LCD panel and the array substrate thereof with a sealant-stop structure to avoid the overflow of the sealant frame while assembling the substrates, thereby preventing the cutting problem due to the overflow exceeding the scrape line. Moreover, in accordance with the present invention, the change or modification for the processes and the machines is not needed. The present invention can be accomplished by the current manufacturing processes, and therefore is cost-effective.

In accordance with an embodiment of the present invention, an LCD panel includes an array substrate, an opposite substrate and a liquid crystal layer. The opposite substrate is placed opposite to the array substrate, and the liquid crystal layer is disposed between the array substrate and the opposite substrate. The array substrate may be a TFT array substrate or a CF array substrate.

In an embodiment, the array substrate includes a substrate, an array, a sealant frame and a sealant-stop structure. The array may be a thin-film transistor array or a color filter array, and is disposed on the substrate. The sealant frame includes a first end and a second end, and the first and second ends form a liquid crystal inlet. The sealant-stop structure is placed on the substrate and placed at least between the first end of the sealant frame and a side of the substrate.

According to the embodiments of the present invention, the sealant-stop structure may be in the form of a trench or a bulged strip. As a result, the overflow of the sealant frame when assembling the array substrate and the opposite substrate is guided and accommodated in the trench or blocked by the bulged strip, so that the overflow is prevented from extending to the side of the substrate, i.e., a cutting line of the mother panel, and the cutting problems can be resolved.

DETAILED DESCRIPTION OF THE INVENTION

Figure 1:
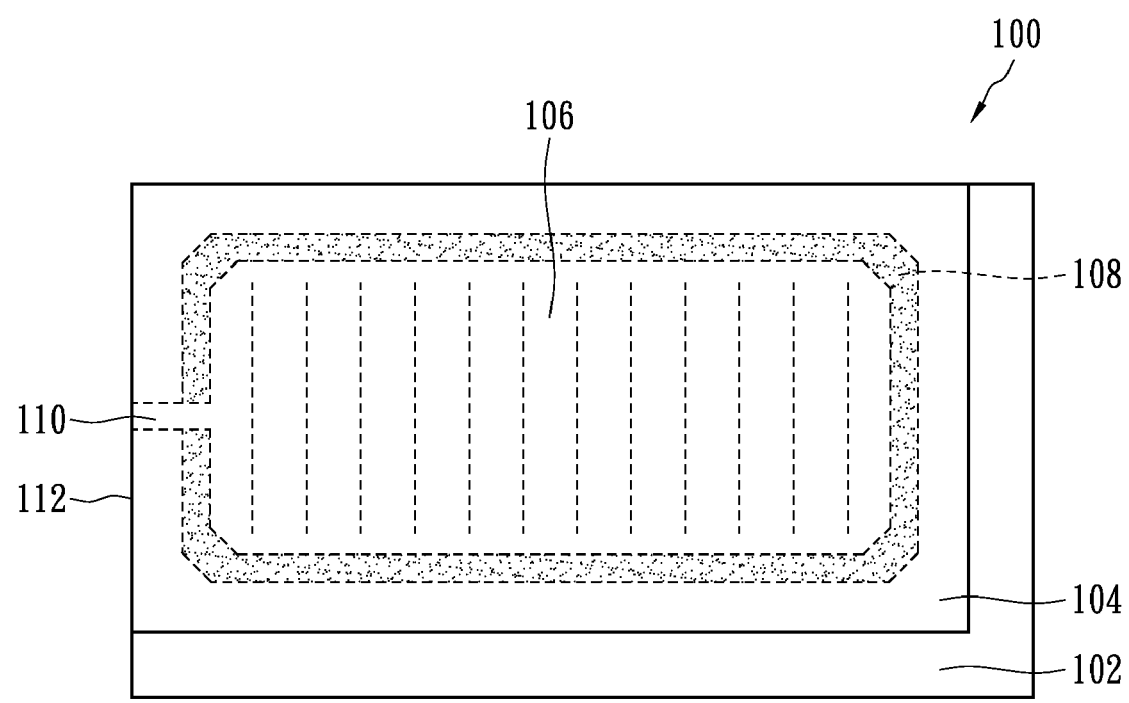
FIG. 1 illustrates a top perspective view of a conventional LCD panel.

Referring to FIG. 1, when outputting the sealant to form the sealant frame 108 and liquid crystal inlet 110, because the beginning and the end of the sealant frame are difficult to control well, the beginning and the end of the sealant frame 108 may overflow after or while the CF array substrate 104 and the TFT array substrate 102 are assembled. If the overflow exceeds a cutting line of the mother panel, e.g., a side 112 adjacent to the liquid crystal inlet 110 of the LCD panel 100, the panel is difficult cut and breach or damage of the panel may occur.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 2:
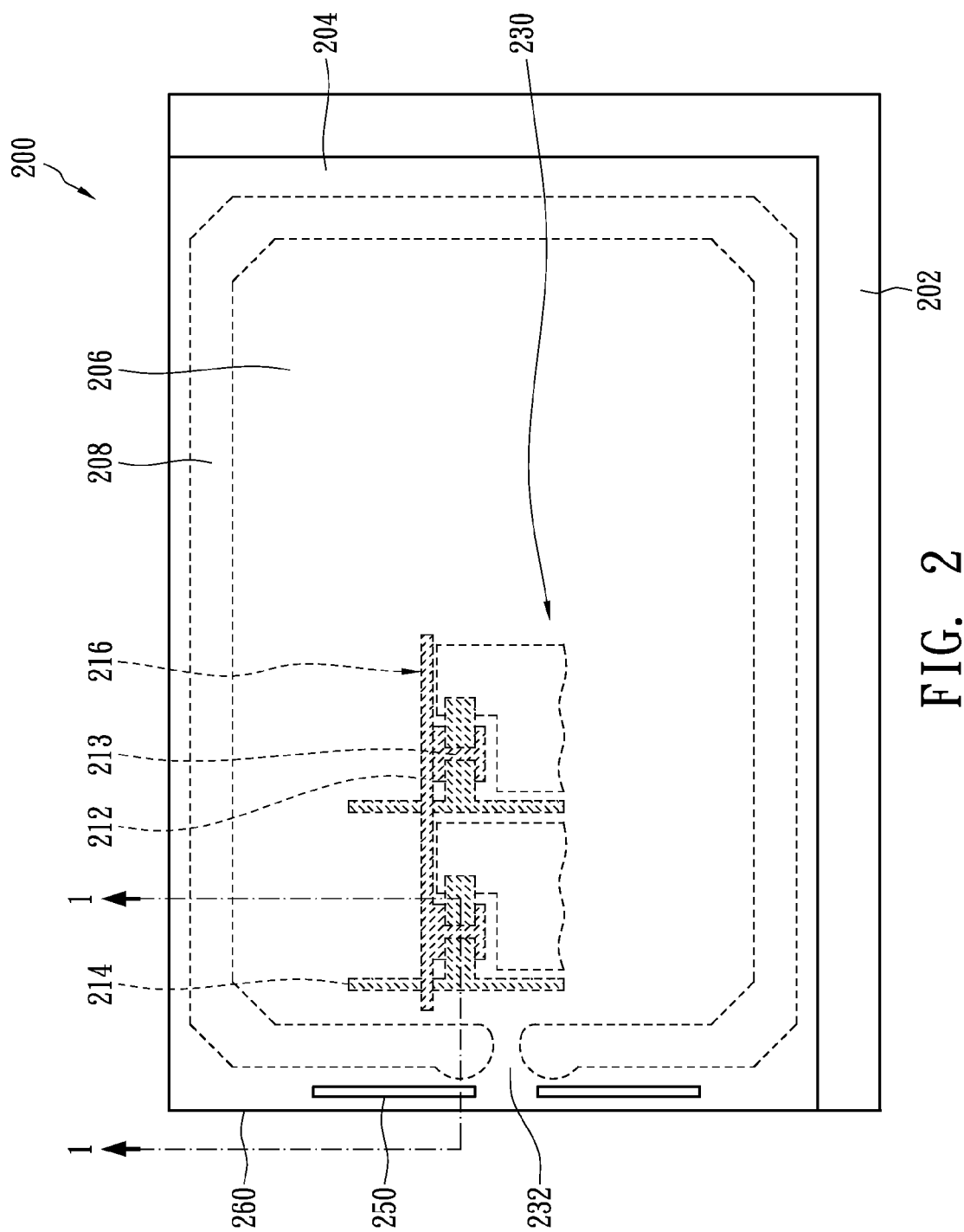
FIG. 2 illustrates a top view of an LCD panel in accordance with the present invention.
Figure 3:
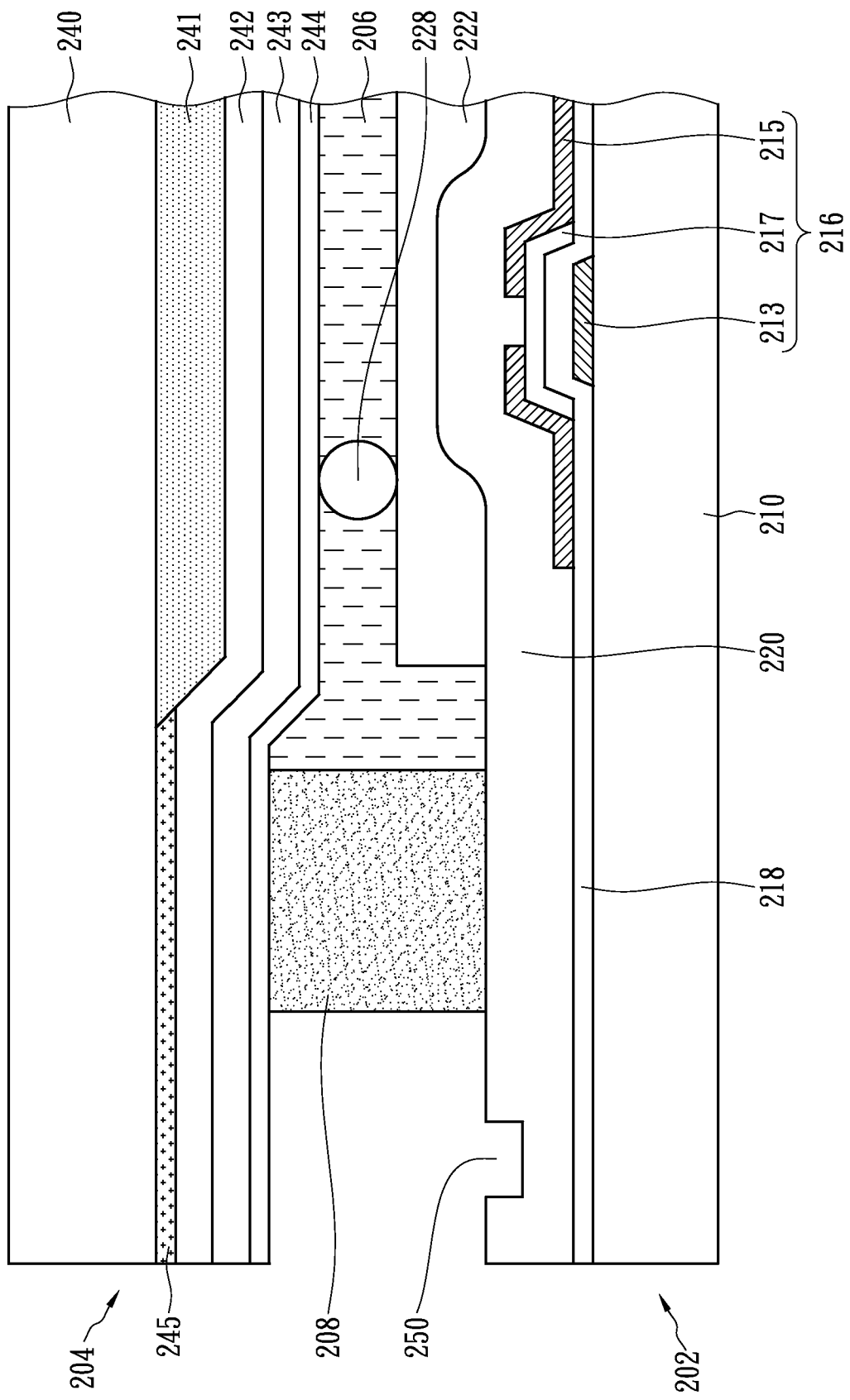
FIG. 3 illustrates the cross-sectional view along line 1-1 of FIG. 2 according to a first embodiment of the present invention.

FIG. 2 illustrates an LCD panel 200 in accordance with an embodiment of the present invention, and FIG. 3 illustrates the cross-sectional view along line 1-1 of FIG. 2 in accordance with a first embodiment of the present invention. The LCD panel 200 includes a TFT array substrate 202, a CF array substrate 204, at least one stop structure, a sealant which may be a sealant frame 208 for example, and a liquid crystal layer 206. The liquid crystal layer 206 is injected into the space confined by the TFT array substrate 202, the CF array substrate 204 and the sealant frame 208 through an inlet which may be a liquid crystal inlet 232 for example. The at least one stop structure is located adjacent to the liquid crystal inlet 232 and side 260.

The TFT array substrate 202 includes a substrate 210, scan lines 212, data lines 214, thin-film transistors 216, a gate dielectric layer 218, a passivation layer 220 and a planarization layer 222. As shown in FIG. 3, however, the planarization layer 222 may be formed completely on the passivation layer 220 so that the sealant frame 208 is disposed on the planarization layer 222, but not limited thereto. The material of the passivation layer 220 may be organic materials, inorganic materials such as silicon oxide or silicon nitride. A polyimide (PI) layer (not shown) is formed on the planarization layer 222. The scan lines 212 and the data lines 214 are substantially perpendicular, and each intersection is provided with a thin-film transistor 216. The thin-film transistors 216 are arranged as an array to form a thin-film transistor array 230. A thin-film transistor 216 includes a gate electrode 213, source/drain electrodes 215 and a channel layer 217. The gate dielectric layer 218 is formed on the substrate 210 and covers the gate electrode 213 of the thin-film transistor 216. The passivation layer 220 is formed on the gate dielectric layer 218 and covers the source/drain electrodes 215 and the channel layer 217 of the thin-film transistor 216.

It should be noted that the LCD panel 200 of FIG. 2 is not illustrated according to actual scale; in order to clearly show structural features, the scan lines 212, the data lines 214 and the thin-film transistors 216 are much larger than other components.

The CF array substrate 204 essentially includes a substrate 240, a shielding layer 245, a color filter layer 241, a passivation layer 242, a transparent electrode layer 243 and an alignment layer 244. The shielding layers 245 are formed as black matrix, and the color filter layers 241 are formed as a color filter array. In an embodiment, the material of the passivation layer 242 may include organic materials, while the material of the shielding layer 245 may include epoxy, metal or other light-shielding metal.

The TFT array substrate 202 and the CF array substrate 204 are spaced by spacers 228 to form room for receiving the liquid crystal layer 206. The liquid crystal inlet 232 is formed between two ends of the sealant frame 208. According to the present invention, stop structure which may be a sealant-stop structure 250 herein is formed between the sealant frame 208 in the vicinity of the liquid crystal inlet 232 and a side 260 of the LCD panel 200, so as to prevent the sealant frame 208 from overflowing when assembling the substrates 202 and 204. The side 260 is equivalent to a cutting line before cutting the panel 200.

Figure 4:
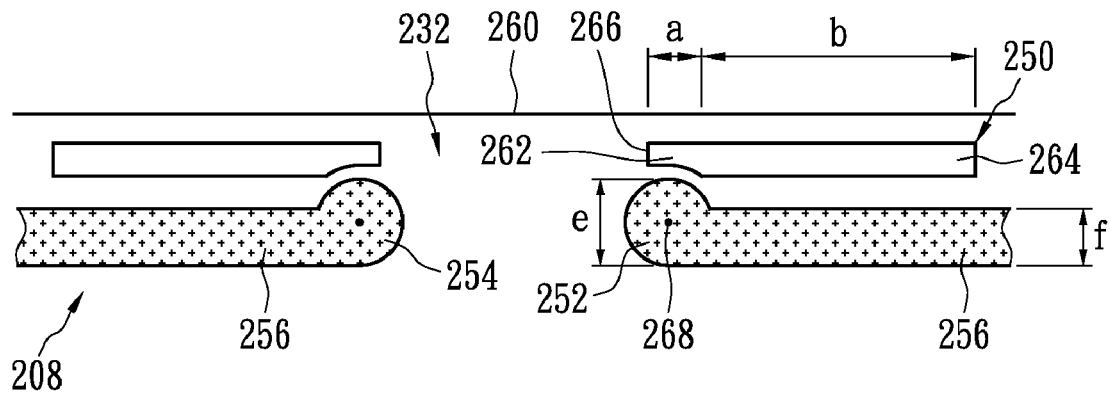
FIG. 4 illustrates an enlarged view of the sealant-stop structure and a portion of the sealant frame according to the first embodiment of the present invention.

In FIG. 3, the sealant-stop structure 250 is a trench and formed in the passivation layer 220. The passivation layer 220 may be comprised of organic or inorganic oxide such as silicon oxide or silicon nitride. A top view of the sealant-stop structure 250 according to an embodiment is shown in FIG. 4. The sealant frame 208 includes a first end 252, a second end 254 and a body portion 256. It should be noted that the sealant frame 208 is not limited to a continuous pattern; a discontinuous pattern with multiple ends can be used also. In this embodiment, any two ends of the sealant frame 208 are exemplified to define the liquid crystal inlet 232. The body portion 256 is connected to the first end 252, surrounds the TFT array 230 and is connected to the second end 254. Because the places of the beginning and the end of the sealant frame 208 are usually provided with a large amount of sealant, the width "e" of the first end 252 or the second end 254 is larger than the width "f" of the body portion 256. In an embodiment, the sealant-stop structure 250 may include a first portion 262 and a second portion 264. An end 266 of the first portion 262 exceeds the center 268 of the beginning or the end of the sealant frame 208, i.e., the center 268 of the first end 252 or the second end 254. The first portion 262 is placed between the first end 252 and the side 260. The second portion 264 is connected to the first portion 262, and placed between the body portion 256 and the side 260, and extends away from the liquid crystal inlet 232. The width "b" of the second portion 264 is larger than the width "a" of the first portion 262.

Figure 5:
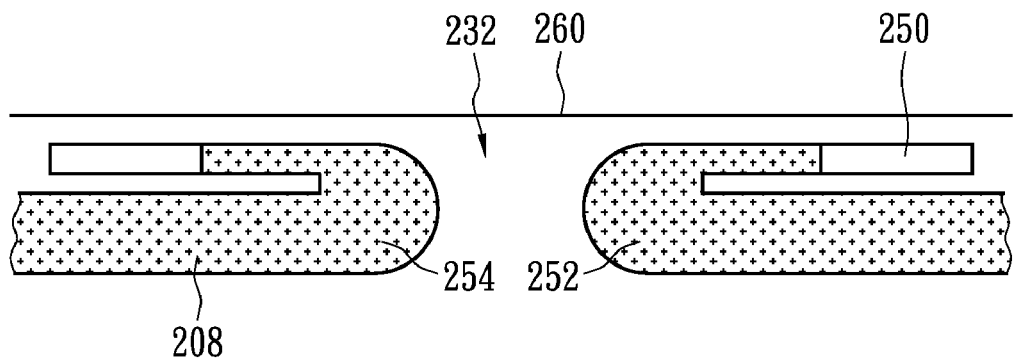
FIG. 5 illustrates the enlarged view of the sealant-stop structure and a portion of the sealant frame when assembling the upper and lower substrates according to the first embodiment of the present invention.

In FIG. 5, when the TFT array substrate 202 and the CF array substrate 204 are combined or assembled, the overflow at the first end 252 and the second end 254 caused by assembling will be guided to the sealant-stop structure 250 which is a trench, and from the first portion 262 to the second portion 264. As a result, the overflow is prevented from exceeding the side 260 (i.e., the cutting line).

Figure 6:
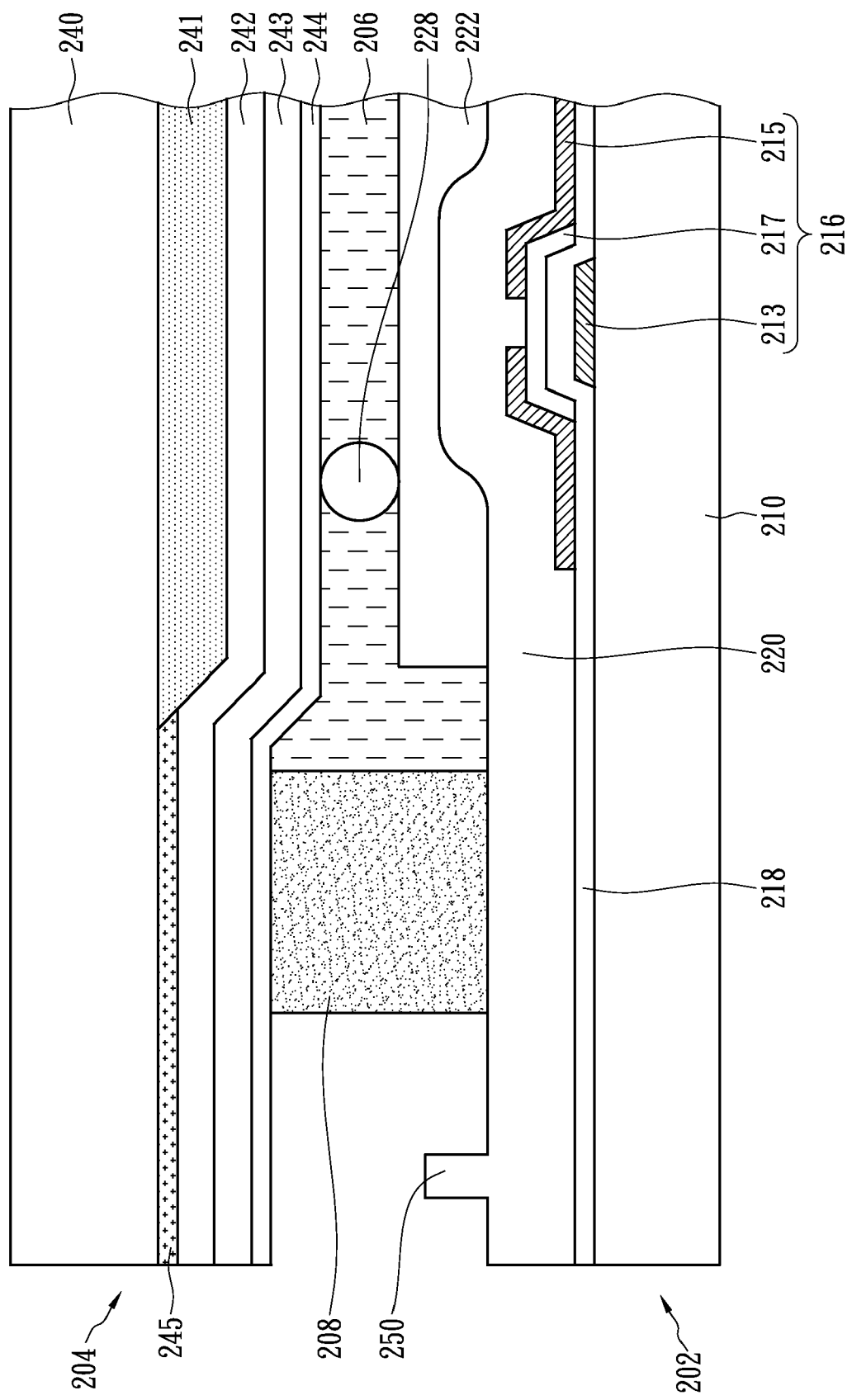
FIG. 6 illustrates the cross-sectional view along line 1-1 of FIG. 2 according to a second embodiment of the present invention.
Figure 7:
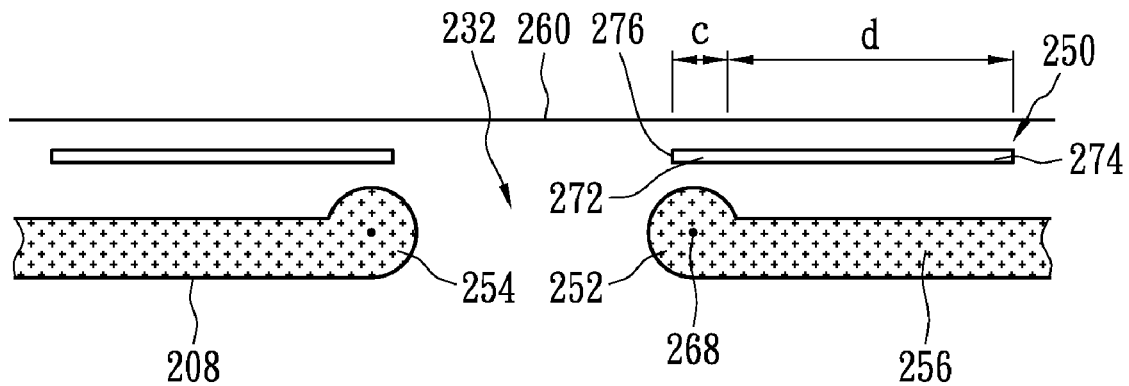
FIG. 7 illustrates an enlarged view of the sealant-stop structure and a portion of the sealant frame according to the second embodiment of the present invention.

FIG. 6 illustrates the cross-sectional view along line 1-1 of FIG. 2 according to a second embodiment. In addition to a trench, the sealant-stop structure 250 may be a bulged strip formed on the passivation layer 220. In other words, the passivation layer 220 forms the bulged strip. FIG. 7 illustrates an enlarged view of the sealant-stop structure 250 and a portion of the sealant frame in accordance with the second embodiment. Compared to the trench shown in FIG. 4, the sealant-stop structure 250 of FIG. 7 is a bulged strip that may include a first portion 272 and a second portion 274. An end 276 of the first portion 272 exceeds the center 268 of the beginning or the end of the sealant frame 208, i.e., the center 268 of the first end 252 or the second end 254. The first portion 272 is placed between the first end 252 and the side 260. The second portion 274 is connected to the first portion 272, and placed between the body portion 256 and the side 260, and extends away from the liquid crystal inlet 232. The length "d" of the second portion 274 is larger than the length "c" of the first portion 272.

Figure 8:
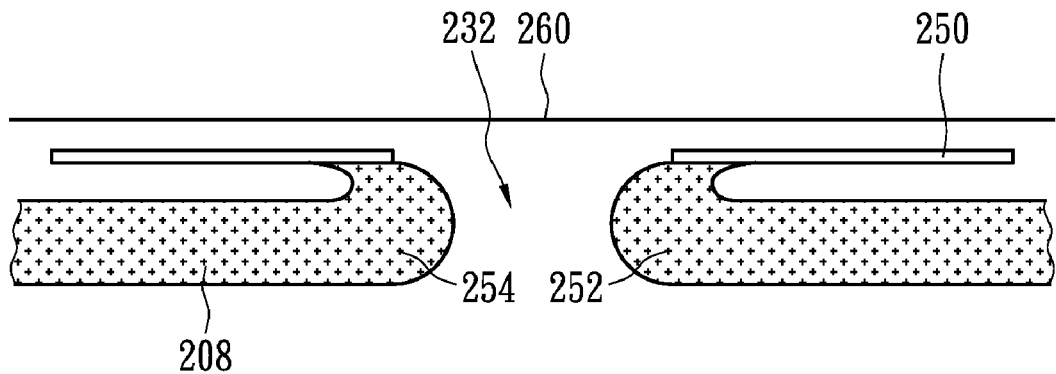
FIG. 8 illustrates the enlarged view of the sealant-stop structure and a portion of the sealant frame in FIG. 7 when assembling the upper and lower substrates of the LCD panel of FIG. 6 according to the second embodiment of the present invention.

In FIG. 8, when the TFT array substrate 202 and the CF array substrate 204 shown in FIG. 6 are combined or assembled, the overflow at the first end 252 and the second end 254 caused by assembling will be blocked by the sealant-stop structure 250 (the bulged strip), and guided between the sealant frame 208 and the sealant-stop structure 250. As a result, the overflow is prevented from exceeding the side 260 (i.e., the cutting line).

Figure 9:
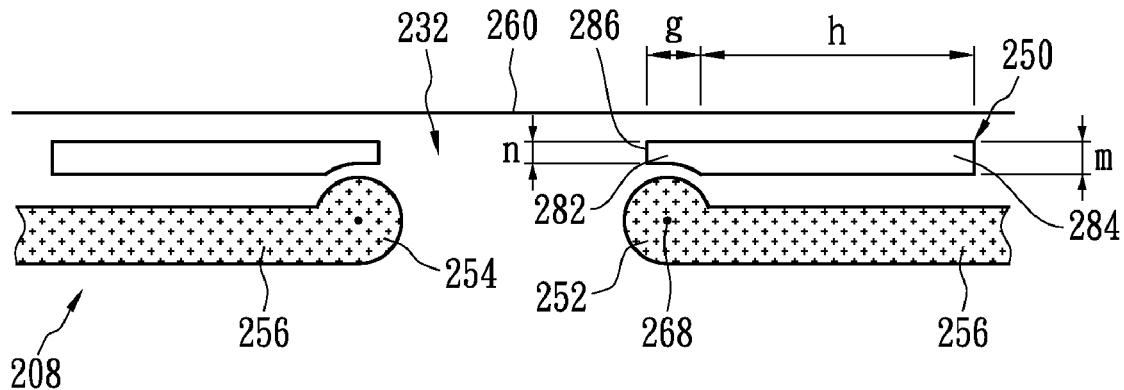
FIG. 9 illustrates an enlarged view of the sealant-stop structure modified from the sealant-stop structure in FIG. 7 and a portion of the sealant frame.

FIG. 9 illustrates an enlarged view of the sealant-stop structure 250 in the form of the bulged strip modified from the sealant-stop structure 250 in FIG. 7 and a portion of the sealant frame 208. The sealant-stop structure 250 includes a first portion 282 and a second portion 284. An end 286 of the first portion 282 exceeds the center 268 of the beginning or the end of the sealant frame 208, i.e., the center 268 of the first end 252 or the second end 254. The first portion 282 is placed between the first end 252 and the side 260. The second portion 284 connected to the first portion 282 is placed between the body portion 256 and the side 260, and extends away from the liquid crystal inlet 232. The length "h" of the second portion 284 is larger than the length "g" of the first portion 282, and the width "m" of the second portion 284 is larger than the width "n" of the first portion 282.

Figure 10:
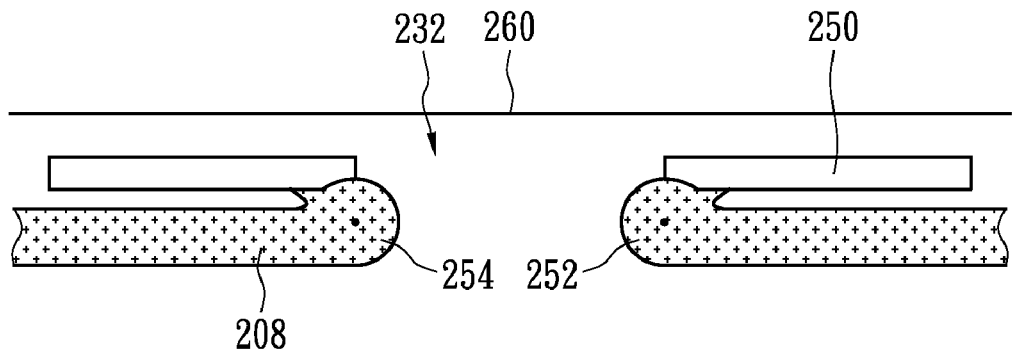
FIG. 10 illustrates the enlarged view of the sealant-stop structure and a portion of the sealant frame in FIG. 9 when assembling the upper and lower substrates of the LCD panel of FIG. 6.

In FIG. 10, when the TFT array substrate 202 and the CF array substrate 204 shown in FIG. 6 are combined or assembled, the overflow at the first end 252 and the second end 254 caused by assembling will be blocked by the sealant-stop structure 250 (the bulged strip), and guided between the sealant frame 208 and the sealant-stop structure 250. As a result, the overflow is prevented from exceeding the side 260 (i.e., the cutting line).

However, if the passivation layer 220 does not extend out of the sealant frame 208, the sealant-stop structure 250 that may be a trench or a bulged strip also can be formed in the gate dielectric layer 218. The gate dielectric layer 218 may be comprised of silicon oxide or silicon nitride.

Figure 11:
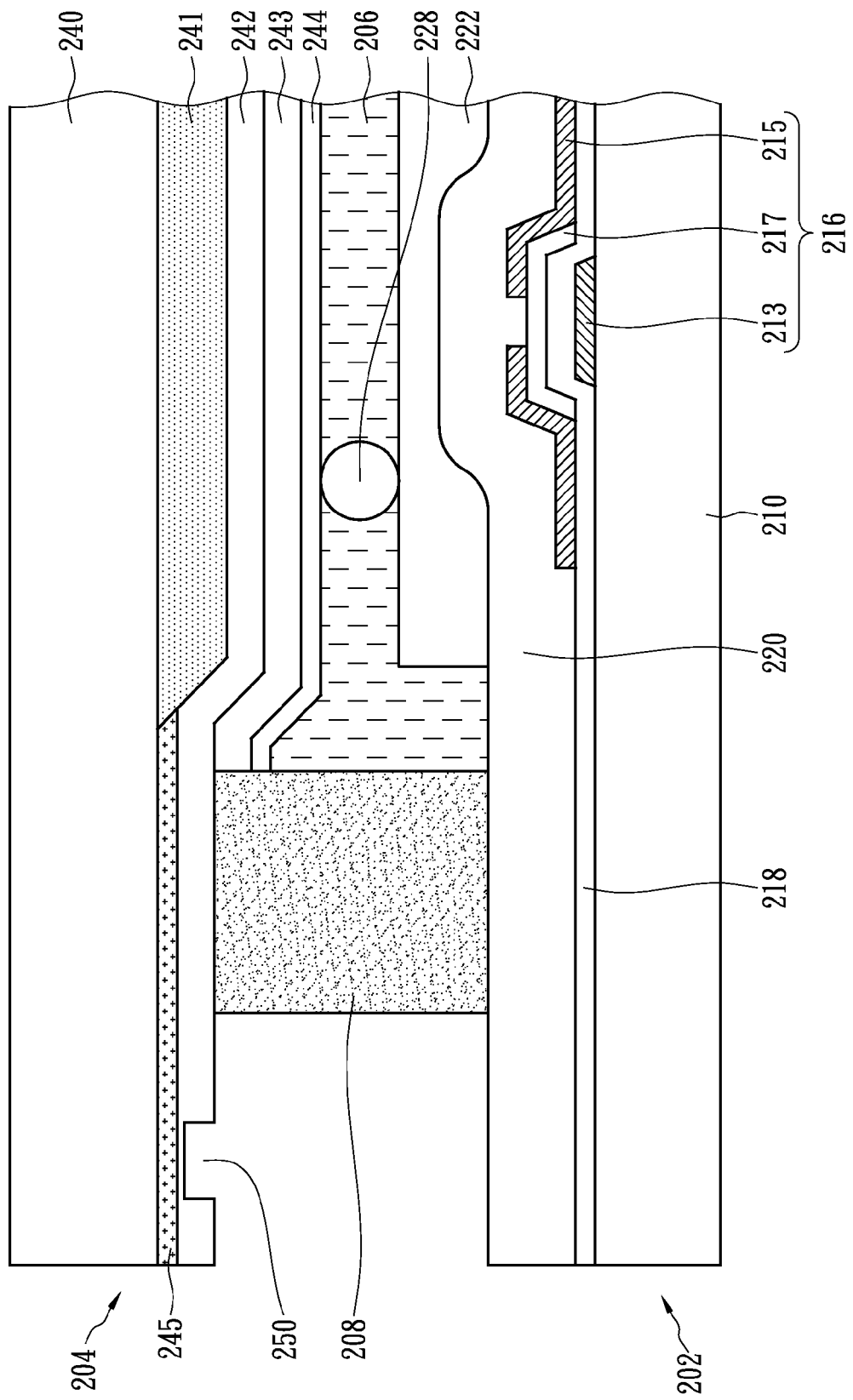
FIG. 11 illustrates the cross-sectional view along line 1-1 of FIG. 2 according to a third embodiment of the present invention.

FIG. 11 illustrates the cross-sectional view along line 1-1 of FIG. 2 according to a third embodiment. In this embodiment, the sealant-stop structure 250 is in the form of a trench that is formed in the passivation layer 242 of the CF array substrate 204. The passivation layer 242 may be comprised of organic material. When assembling the TFT array substrate 202 and the CF array substrate 204, the CF array substrate 204 is placed underneath the TFT array substrate 202 (i.e., an upside-down view of FIG. 11), and the overflow-prevention mechanism is similar to that of FIG. 5. The overflow caused by assembling the substrate 202 and the substrate 204 is guided to the trench of the sealant-stop structure 250, thereby preventing the overflow from exceeding the side 260 (i.e., the cutting line). However, the transparent electrode layer 243 may be formed to substantially extend to the side 260 of the substrate 240, and covers the sealant-stop structure 250 so that the sealant frame 208 is disposed on the transparent electrode layer 243.

Figure 12:
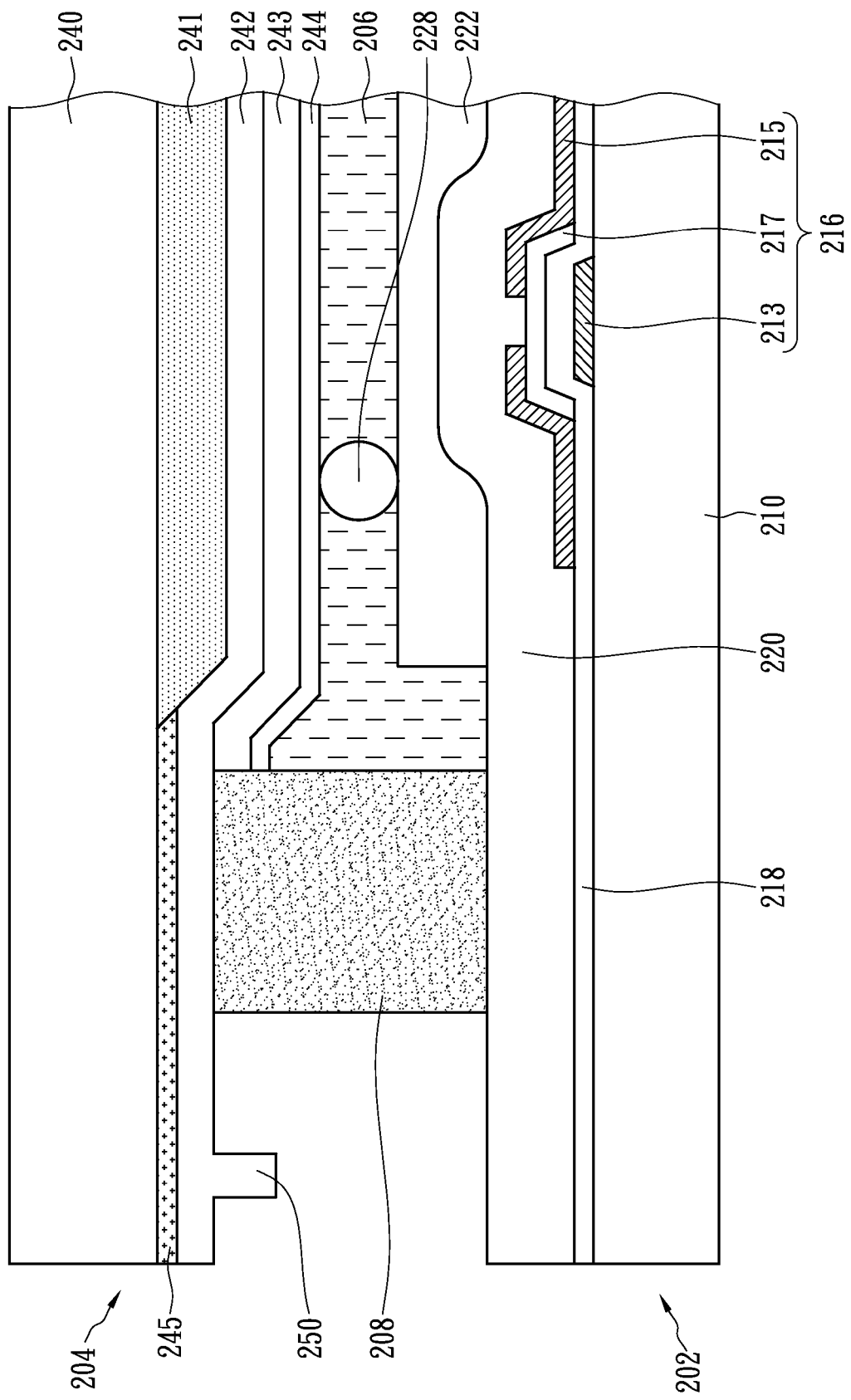
FIG. 12 illustrates the cross-sectional view along line 1-1 of FIG. 2 according to a fourth embodiment of the present invention.

FIG. 12 illustrates the cross-sectional view along line 1-1 of FIG. 2 according to a fourth embodiment of the present invention. In this embodiment, the sealant-stop structure 250 is in the form of a bulged strip and is formed in the passivation layer 242 of the CF array substrate 204. For instance, the thickness of the bulged strip is in the range of 4 to 6 micrometers. However, the transparent electrode layer 243 may be formed to substantially extend to the side 260 of the substrate 240, and covers the sealant-stop structure 250 so that the sealant frame 208 is disposed on the transparent electrode layer 243.

However, if the passivation layer 242 does not extend out of the sealant frame 208, the sealant-stop structure 250 that may be a trench or a bulged strip also can be formed in the shielding layer 245 (black matrix), i.e., the shielding layer 245 forms the sealant-stop structure 250. The shielding layer 245 may include epoxy, metal or inorganic oxide. Moreover, if the color filter layer 241 extends out of the sealant frame 208, the sealant-stop structure 250 that may be a trench or a bulged strip also can be formed in the color filter layer 241, i.e., the color filter layer 241 forms the sealant-stop structure 250. The material of the stop structure 250 is comprised of inorganic oxide, organic material, color resist or epoxy. As a result, the overflow is prevented from exceeding the side 260 (i.e., the cutting line), and the cutting problems can be avoided.

The present invention can be accomplished by current processes in production without changing current processes and machines. The sealant-stop structure in the vicinity of the liquid crystal inlet is formed on either the TFT array substrate or the CF array substrate by performing developing and etching processes, and therefore the overflow is guided to other places or accommodated in the trench. As a result, the overflow of the sealant frame is prevented from exceeding the cutting line, so as to avoid cutting problems.

The above-described embodiments of the present invention are intended to be illustrative only. Numerous alternative embodiments may be devised by those skilled in the art without departing from the scope of the following claims.

What is claimed is:

1. A liquid crystal display panel, comprising:
   an array substrate, comprising:
      a substrate;
      an array including a passivation layer, disposed on the substrate;
      a sealant having a first end and a second end, disposed on the substrate and substantially surrounding the array, wherein the first end and the second end form an inlet, wherein the passivation layer has a stop structure located between the first end of the sealant and a side of the substrate, wherein the sealant further has a body portion connected to the first end, and the first end is wider than the body portion;
   an opposite substrate disposed opposite to the array substrate, wherein the sealant is substantially located between the passivation layer and the opposite substrate; and
   a liquid crystal layer disposed between the array substrate and the opposite substrate.

2. The liquid crystal display panel of claim 1, wherein the array is a thin film transistor array or a color filter array.

3. The liquid crystal display panel of claim 1, wherein the stop structure has:
   a first portion placed between the first end and the side of the substrate; and
   a second portion connected to the first portion and placed between the body portion and the side of the substrate, wherein the second portion is wider than the first portion.

4. The liquid crystal display panel of claim 3, wherein the first portion comprises a first trench, the second portion comprises a second trench, and the second trench extends away from the inlet.

5. The liquid crystal display panel of claim 3, wherein the first portion comprises a first bulged strip, the second portion comprises a second bulged strip, and the second bulged strip extends away from the inlet.

6. The liquid crystal display panel of claim 3, wherein the material of the stop structure comprises inorganic oxide, organic material, color resist or epoxy.

7. The liquid crystal display panel of claim 1, wherein the material of the stop structure comprises inorganic oxide, organic material, color resist or epoxy.

* * * * *